(12) United States Patent
Hong et al.

(10) Patent No.: US 9,110,522 B2
(45) Date of Patent: Aug. 18, 2015

(54) DEVICE AND METHOD FOR CONVERTING INPUT SIGNAL

(71) Applicant: ELECTRONICS AND TELECOMMUNICATIONS RESEARCH INSTITUTE, Daejeon (KR)

(72) Inventors: Kang-Woon Hong, Seoul (KR); Chang-Woo Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/055,724

(22) Filed: Oct. 16, 2013

(65) Prior Publication Data

US 2014/0115196 A1    Apr. 24, 2014

(30) Foreign Application Priority Data

Oct. 19, 2012  (KR) .................. 10-2012-0116920
Oct. 1, 2013   (KR) .................. 10-2013-0117543

(51) Int. Cl.
*G06F 3/038*  (2013.01)
*G06F 3/00*   (2006.01)

(52) U.S. Cl.
CPC . *G06F 3/038* (2013.01); *G06F 3/00* (2013.01)

(58) Field of Classification Search
CPC ....... G06F 3/00; G06F 3/002; G08C 2201/42; G08C 2201/93; G08C 23/04
See application file for complete search history.

(56) References Cited

U.S. PATENT DOCUMENTS

| 2004/0249925 | A1  | 12/2004 | Jeon et al. |
| 2012/0057078 | A1* | 3/2012  | Fincham ...................... 348/645 |
| 2012/0151100 | A1* | 6/2012  | Roche et al. .................... 710/16 |
| 2013/0290419 | A1* | 10/2013 | Spencer et al. ............... 709/204 |

FOREIGN PATENT DOCUMENTS

| KR | 10-2004-0104871 A | 12/2004 |
| KR | 10-2011-0101772 A | 9/2011  |

* cited by examiner

*Primary Examiner* — Chun-Kuan Lee
*Assistant Examiner* — Ronald Modo

(57) ABSTRACT

Provided is an input signal converting device, including a device input receiving unit configured to receive an input signal from an input device, and extract a type of the input device from which the received input signal is generated and an input event corresponding to the input signal, an input event converting unit configured to obtain an output event in a corresponding user terminal and a type of a user terminal corresponding to the extracted input device type and input event, and a device input transmitting unit configured to generate an output signal corresponding to the output event to be output to the user terminal, and deliver the generated output signal to the user terminal.

11 Claims, 5 Drawing Sheets

DEVICE AND METHOD FOR CONVERTING INPUT SIGNAL

CROSS-REFERENCE TO RELATED APPLICATION

This application claims the benefit under 35 U.S.C. §119 (a) of Korean Patent Application No. 10-2012-0116920, filed on Oct. 19, 2012, and 10-2013-0117543, filed on Oct. 1, 2013, in the Korean Intellectual Property Office, the entire disclosures of which are incorporated herein by references for all purposes.

BACKGROUND

1. Field

The following description relates to interface technology, and more particularly, to a device and method for converting a user input signal generated in various input devices into a signal compatible with a user terminal.

2. Description of the Related Art

In the past, a keyboard and a mouse are only used to use a computer. However, in recent years, various user input methods are used depending on purposes, for example, gaming, Internet, and simple word processing. As mobile computers have become popular, hands-free user interfaces capable of inputting and outputting, that is, technology for input/output interfaces using various types of devices has been actively under development. For example, in consideration of user convenience, technology for voice input/output that uses a multimodal interface in which a voice interface is added to a conventional graphic interface (for example, a touchscreen) is developed. That is, using a wireless communication terminal equipped with a touchscreen, input/output is performed using a touchscreen method (pen input and screen output) while a user does not move. While the user moves, an interface is switched to a voice interface, and it is possible to give a voice command and be provided with results. In addition, input and output functions may also be performed using mutually different types of interfaces (for example, voice input and screen output).

However, in order to use a specific user input method in a user terminal, it is necessary to develop hardware and software for using an input device whenever a new input device is added such that the user terminal receives and analyzes input of a corresponding input device. This is because input signals transmitted and received between a user terminal and a user input device are different. When the user terminal is added, this problem repeatedly occurs.

Therefore, a method and device for converting an input signal which can use transmitting and receiving input signals without changes of the user terminal and the user input device are necessary.

SUMMARY

The following description relates to a device and method that can convert input signals received from various devices into signals can be identified by a user terminal, and use the converted signals as input of the user terminal.

In one general aspect, there is provided an input signal converting device, including, a device input receiving unit configured to receive an input signal from an input device, and extract a type of the input device from which the received input signal is generated and an input event corresponding to the input signal, an input event converting unit configured to obtain an output event in a corresponding user terminal and a type of a user terminal corresponding to the extracted input device type and input event, and a device input transmitting unit configured to generate an output signal corresponding to the output event to be output to the user terminal, and deliver the generated output signal to the user terminal.

In another aspect, there is provided a virtual device server, including an input analyzing unit configured to analyze a received input signal and determine a type of an input device and an input event, and a conjunction transmitting and receiving unit configured to receive an input signal of a specific input device from an input signal converting device, deliver the signal to the input analyzing unit, and deliver the input device type and input event output from the input analyzing unit to the input signal converting device.

In still another aspect, there is provided an input signal converting method including, receiving an input signal from a specific input device, extracting a type of the input device from which the received input signal is generated, and an input event corresponding to the input signal, obtaining an output event in a corresponding user terminal and a user terminal type corresponding to the extracted input device type and input event, generating an output signal corresponding to the output event to be output to the corresponding user terminal, and delivering the generated output signal to the user terminal.

In yet another aspect, there is provided an input signal mapping method in a virtual device server connected to an input signal converting device via wired and/or wireless communication, the method including, receiving an input signal of a specific input device from an input signal converting device, analyzing the received input signal and determining a type of the input device and an input event, and delivering the determined input device type and input event to the input signal converting device.

Other features and aspects will be apparent from the following detailed description, the drawings, and the claims.

Figure 1:
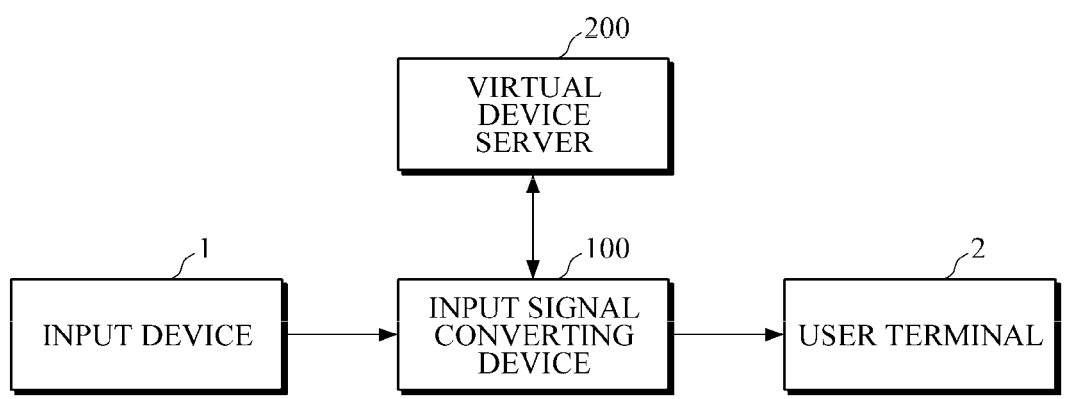
FIG. 1 is a diagram illustrating a configuration of a system including an input signal converting device according to an embodiment of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the invention will be described in detail with reference to the accompanying drawings. The following embodiments should be considered in a descriptive sense only in order to understand of the spirit of the invention and the scope of the invention is not limited to the exemplary embodiments.

FIG. 1 is a diagram illustrating a configuration of a system including an input signal converting device according to an embodiment of the invention.

As illustrated in FIG. 1, an input signal converting device 100 is provided between an input device 1 and a user terminal 2, converts a physical input signal from the input device 1 into an output signal capable of being input to the user terminal 2, and outputs the result.

Here, the input device 1 may include a keyboard and a mouse serving as a user interface of conventional computer systems, and include input/output interfaces using various types of devices such as hands-free user interfaces capable of inputting and outputting with spread of mobile computers. That is, the input device 1 may be an input device that can generate a signal, for example, an infrared signal, a WiFi signal, an Ethernet signal, a USB signal, and a Bluetooth signal.

The user terminal 2 may be a terminal that is held by an individual and that can perform computer functions, such as a wearable computer, a wireless communication terminal, and a mobile multimedia player. Here, the wireless communication terminal may be a terminal capable of wirelessly communicating, for example, a mobile communication terminal, a personal communication service (PCS), a personal digital assistant (PDA), a smartphone, and a wireless LAN terminal.

However, when the input signal converting device 100 is not able to extract the input device and input event corresponding to the input signal, the input signal is delivered to an accessible virtual device server 200 via wired and/or wireless communication, and a type of the input device and an input event may be extracted.

Figure 2:
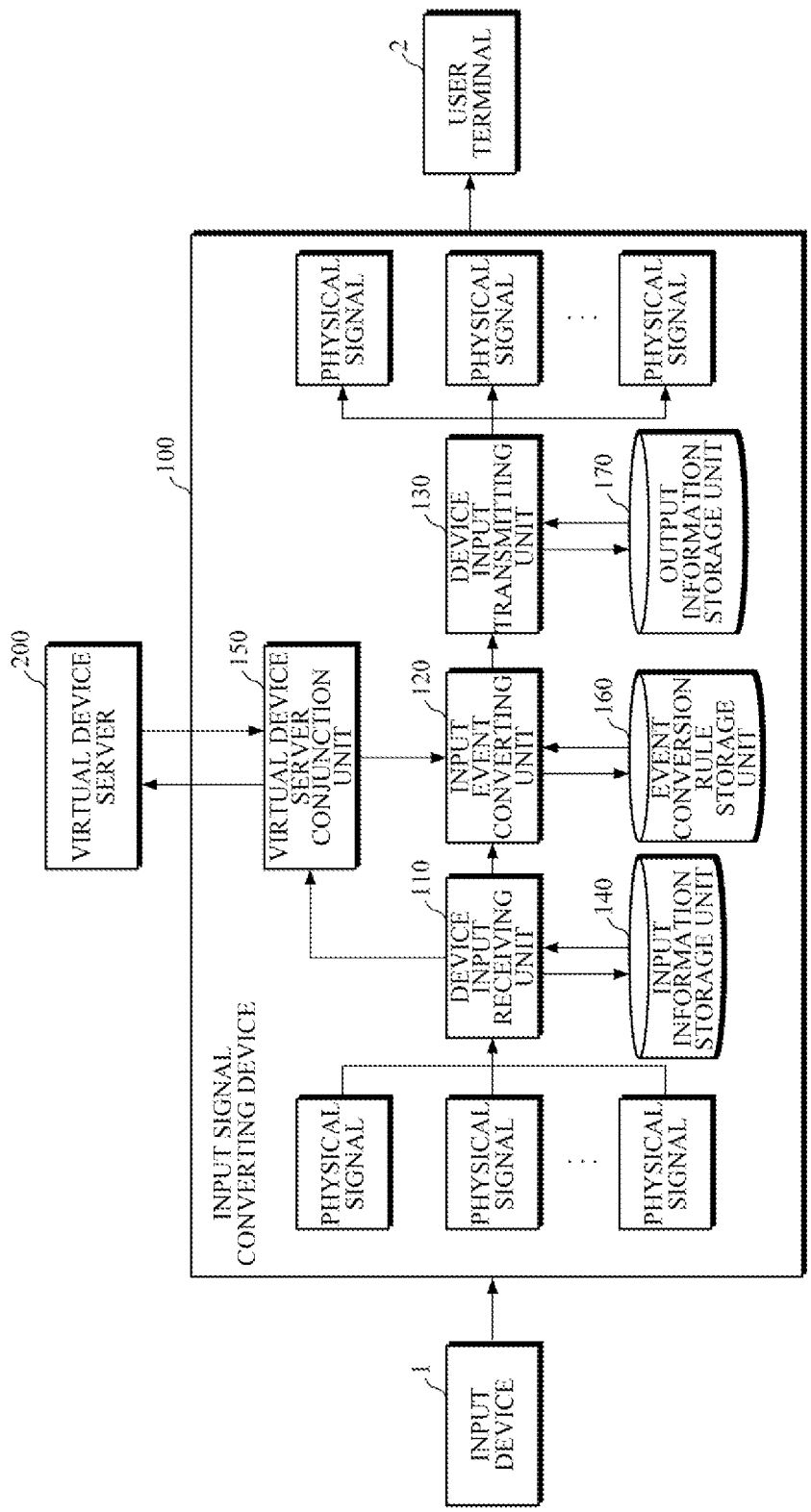
FIG. 2 is a diagram illustrating a configuration of the input signal converting device according to the embodiment of the invention.

FIG. 2 is a diagram illustrating a configuration of the input signal converting device according to the embodiment of the invention.

As illustrated in FIG. 2, the input signal converting device 100 according to the embodiment of the invention includes a device input receiving unit 110, an input event converting unit 120, and a device input transmitting unit 130.

The device input receiving unit 110 receives a physical input signal from the input device 1, and extracts a type of the input device from which the received input signal is generated and an input event corresponding to the input signal. Here, the input signal may include at least one of an infrared signal, a WiFi signal, an Ethernet signal, a USB signal, and a Bluetooth signal.

In addition, the input signal converting device 100 may further include an input information storage unit 140 configured to store the input device type and input event respectively corresponding to at least one input signal. The device input receiving unit 110 extracts the input device type and input event corresponding to the input signal from the input information storage unit 140.

When the user terminal 2 is, for example, a television, functions of the television are controlled by an infrared remote control. However, a user may use a Bluetooth device or a Kinect device of Microsoft as the input device 1. In this case, the input signal converting device 100 may extract a physical signal (Bluetooth) transmitted from the Bluetooth device and an operation event indicated by the physical signal.

However, the device input receiving unit 110 may not extract the input device type and input event corresponding to the input signal from the input information storage unit 140. In this case, the input device type and input event corresponding to the input signal may be obtained by the external virtual device server 200.

To this end, the input signal converting device 100 may further include a virtual device server conjunction unit 150 configured to deliver the input signal to the external virtual device server 200, receive the input device type and input event from the virtual device server 200, and input the received input device type and input event to the input event converting unit 120. Then, when it is difficult to extract the input device type and input event for the input signal, the device input receiving unit 110 transmits the input signal to the virtual device server conjunction unit 150.

For example, the input signal converting device 100 may receive a physical signal (USB) transmitted from the Kinect device and an operation event indicated by the physical signal may not be identifiable. In this case, operation event information in response to physical signals may be provided from the virtual device server 200.

Meanwhile, when the user inputs using the Kinect device, since the input signal converting device 100 is not able to identify an operation event indicated by the received USB physical signal, the input signal is delivered to the virtual device server 200 through the virtual device server conjunction unit 150, and the input event information may be extracted from input data by a program executed in the virtual device server 200.

The input event converting unit 120 obtains an output event in a corresponding user terminal and a type of the user terminal corresponding to the extracted input device type and input event.

The input signal converting device 100 may further include an event conversion rule storage unit 160 configured to store the output event in the corresponding user terminal and the user terminal type corresponding to at least one input device type and input event. Moreover, the input event converting unit 120 may extract output event information corresponding to each input event from the event conversion rule storage unit 160.

For example, the input event converting unit 120 uses the Bluetooth device and the input event as a search key, extracts an output device type (infrared device) and output event information corresponding to the input event from the event conversion rule storage unit 160, and delivers the result to the device input transmitting unit 130.

The device input transmitting unit 130 generates an output signal corresponding to the output event to be output to the user terminal 2, and delivers the generated output signal to the user terminal 2.

The input signal converting device 100 may further include an output information storage unit 170 configured to store output signal information corresponding to at least one user terminal type and output event. In addition, the device input transmitting unit 130 may extract the output signal corresponding to the extracted user terminal type and output signal from the output information storage unit 170.

For example, the device input transmitting unit 130 may generate an infrared physical signal corresponding to the output event and deliver the signal to the television.

Figure 3:
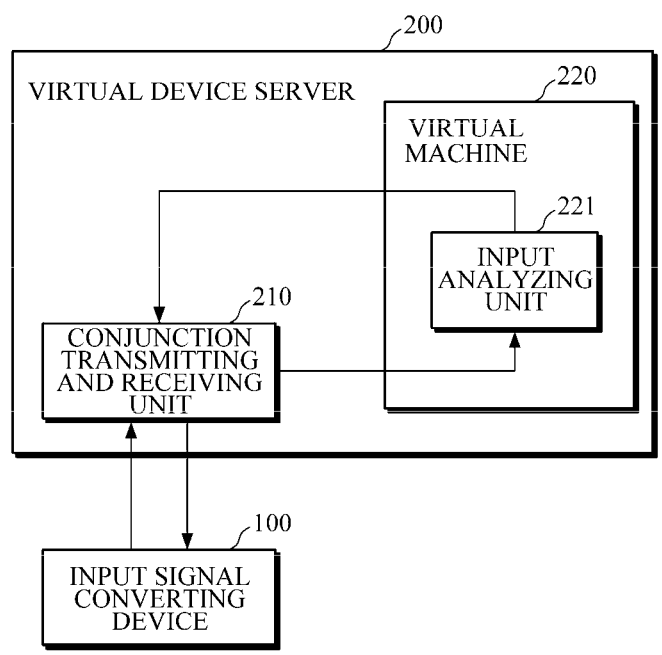
FIG. 3 is a diagram illustrating a configuration of a virtual device server according to the embodiment of the invention.

FIG. 3 is a diagram illustrating a configuration of the virtual device server according to the embodiment of the invention.

As illustrated in FIG. 3, the virtual device server 200 includes a conjunction transmitting and receiving unit 210 and an input analyzing unit 221.

The conjunction transmitting and receiving unit 210 receives an input signal of a specific input device from the input signal converting device 100, delivers the signal to the input analyzing unit 221, and delivers an input device type and an input event determined by the input analyzing unit 221 to the input signal converting device 100.

This input analyzing unit 221 provides an operating system environment operated in the input device, is installed in the virtual machine 220 that performs operations in response to the input signal, analyzes the input signal operated in the virtual machine 220, and determines the input device type and input event information.

Figure 4:
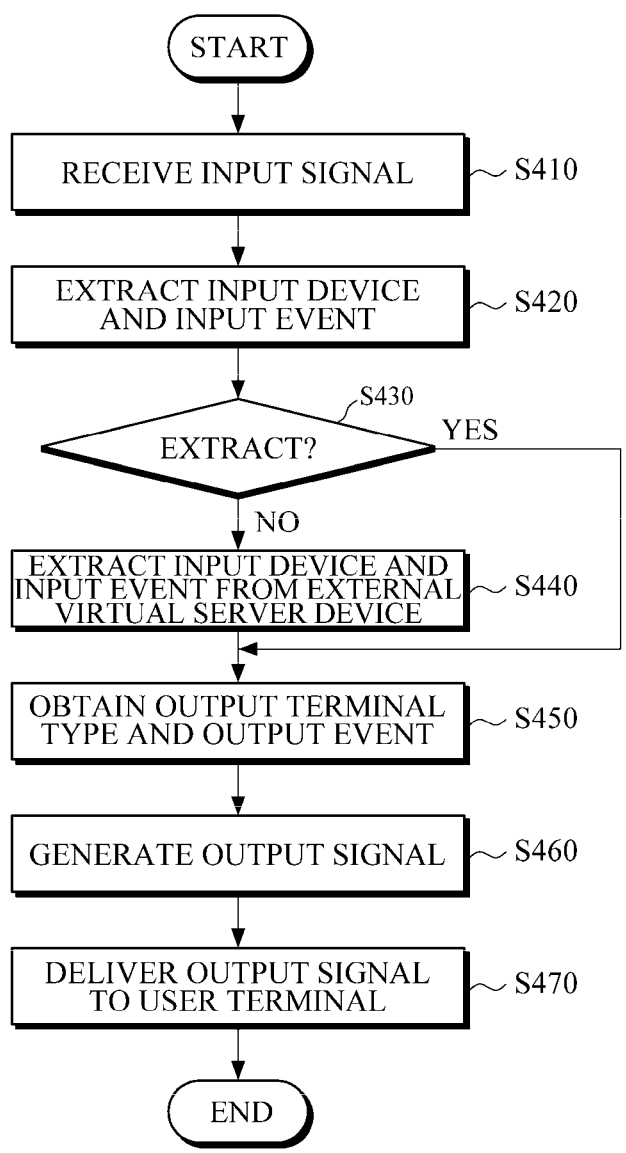
FIG. 4 is a flowchart illustrating an input signal converting method according to an embodiment of the invention.

FIG. 4 is a flowchart illustrating an input signal converting method according to an embodiment of the invention.

As illustrated in FIG. 4, in operation 410, the input signal converting device 100 receives an input signal from a specific input device. In operation 420, a type of the input device from which the received input signal is generated and an input event corresponding to the input signal are extracted.

In operation 430, the input signal converting device 100 determines whether the input device type and input event for the input signal are extracted. When the input device type and input event are extracted, the process proceeds to operation 440.

On the other hand, when it is determined that the input device type and input event for the input signal are not extracted in operation 430, the input signal converting device obtains the input device type and input event for the input signal from the external virtual device server in operation 440.

Next, the input signal converting device 100 obtains an output event in a corresponding user terminal and a type of the user terminal corresponding to the extracted input device type and input event in operation 450, and generates an output signal corresponding to the output event to be output to the corresponding user terminal in operation 460. Then, in operation 470, the generated output signal is delivered to the user terminal.

Figure 5:
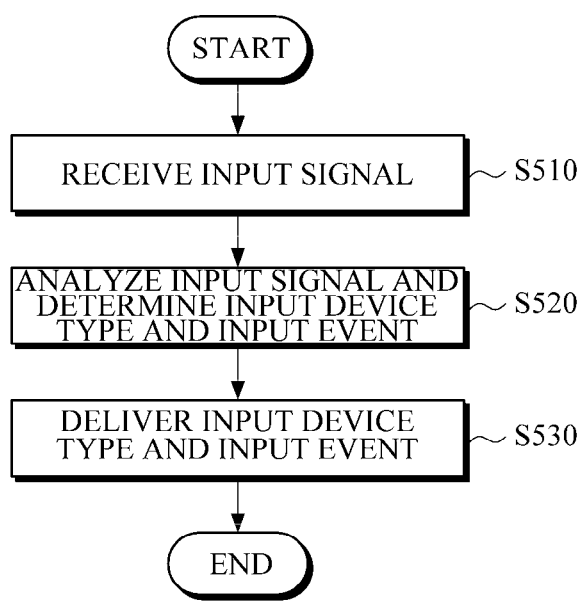
FIG. 5 is a flowchart illustrating an input signal mapping method in the virtual device server according to the embodiment of the invention.

FIG. 5 is a flowchart illustrating an input signal mapping method in the virtual device server according to the embodiment of the invention.

As illustrated in FIG. 5, the virtual device server 200 receives an input signal of a specific input device from the input signal converting device 100 in operation 510. In operation 520, the received input signal is analyzed to determine a type of an input device type and an input event. That is, under an operating system environment operated in the input device, operations in response to the input signal are performed, and the input signal due to performing of the operation is analyzed to determine the input device type and input event information.

Then, in operation 530, the virtual device server 200 delivers the determined input device type and input event to the input signal converting device 100.

The above-described descriptions are only exemplary embodiments of the invention. It will be understood by those skilled in the art that modifications in form may be made without departing from the spirit and scope of the invention. Therefore, the invention is not limited to the above-described embodiments and encompasses all modifications and equivalents that fall within the scope of the appended claims and will be construed as being included in the present invention.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An input signal converting device comprising:
a device input receiving unit configured to receive an input signal from an input device, extract a type of the input device from the input signal, and extract an input event from the input signal;
an input event converting unit configured to obtain an output type of a user terminal and an output event associated with the output type, each of the output type and the output event corresponding to the extracted input device type and input event; and
a device input transmitting unit configured to generate an output signal corresponding to the output event, and deliver the generated output signal to the user terminal,
wherein the input event corresponds to a user command input event,
wherein the generated output signal is configured to control an operation of the user terminal,
wherein the input signal and the output signal are configured to control a type of device like the user terminal, and
wherein the input signal converting device is provided between the input device and the user terminal, each of which is one of various types of devices.

2. The device according to claim 1, wherein the input signal includes at least one of an infrared signal, a WiFi signal, an Ethernet signal, a USB signal, and a Bluetooth signal.

3. The device according to claim 1, further comprising an input information storage unit configured to store the input device type and input event respectively corresponding to at least one input signal,
wherein the device input receiving unit extracts the input device type and input event corresponding to the input signal from the input information storage unit.

4. The device according to claim 1, further comprising a virtual device server conjunction unit configured to deliver the input signal to an external virtual device server, receive the input device type and input event corresponding the input signal from the virtual device server, and input the received input device type and input event to the input event converting unit.

5. The device according to claim 4, wherein, when the device input receiving unit is unable to extract the input device type and input event corresponding to the input signal, the device input receiving unit delivers the input signal to the virtual device server conjunction unit.

6. The device according to claim 1, further comprising an event conversion rule storage unit configured to store the output event and the output type of the user terminal corresponding to the input device type and input event,
wherein the input event converting unit extracts output event information corresponding to the input event from the event conversion rule storage unit.

7. The device according to claim 1, further comprising an output information storage unit configured to store output signal information corresponding to at least one user terminal type and output event, wherein the device input transmitting unit extracts the output signal corresponding to the user terminal type and output event from the output information storage unit.

8. A virtual device server comprising:

an input analyzing unit configured to analyze a received input signal and determine a type of an input device and an input event; and a conjunction transmitting and receiving unit configured to receive an input signal from an input signal converting device, deliver the input signal to the input analyzing unit, and deliver the input device type and input event output from the input analyzing unit to the input signal converting device, wherein the input analyzing unit provides an operating system environment operated in the input device, is installed in a virtual machine that performs operations in response to the input signal, analyzes the input signal operated in the virtual machine, and determines the input device type and input event.

9. An input signal converting method in an input signal converting device, the method comprising:

receiving an input signal from an input device;

extracting a type of the input device from the input signal;

extracting an input event from the input signal, wherein the input event corresponds to a user command input event;

obtaining an output type of a user terminal and an output event associated with the output type, each of the output type and the output event corresponding to the extracted input device type and input event;

generating an output signal corresponding to the output event;

delivering the generated output signal to the user terminal, wherein the generated output signal is configured to control an operation of the user terminal, and wherein the input signal and the output signal are configured to control a type of device like the user terminal, and wherein the input signal converting device is provided between the input device and the user terminal, each of which is one of various types of devices.

10. The method according to claim 9, wherein in the extracting, when the input signal converting device fails to extract the input device type and input event corresponding to the input signal, the input device type and input event corresponding to the input signal are obtained from an external virtual device server.

11. An input signal mapping method in a virtual device server connected to an input signal converting device via wired and/or wireless communication, the method comprising:

receiving an input signal of an input device from an input signal converting device;

analyzing the input signal and determining a type of the input device and an input event corresponding to the input signal; and delivering the determined input device type and input event to the input signal converting device, wherein the determining includes:

performing operations in response to the input signal under an operating system environment operated in the input device; and analyzing the input signal due to performing of the operation and determining the input device type and input event information.

* * * * *